Jan. 28, 1964   J. G. S. BILLINGSLEY ETAL   3,119,294
CUTTING APPARATUS WITH ADJUSTABLE BLADE MEANS
Filed Sept. 1, 1960   4 Sheets-Sheet 1

INVENTORS
JOHN GEORGE SELBY BILLINGSLEY
LESTER RATHBURN MUMMERY
SHERMAN ARTHUR ROGERS

BY *Harry C. Braddock*
ATTORNEY

INVENTORS
JOHN GEORGE SELBY BILLINGSLEY
LESTER RATHBURN MUMMERY
SHERMAN ARTHUR ROGERS
BY *Harry E. Braddock*
ATTORNEY

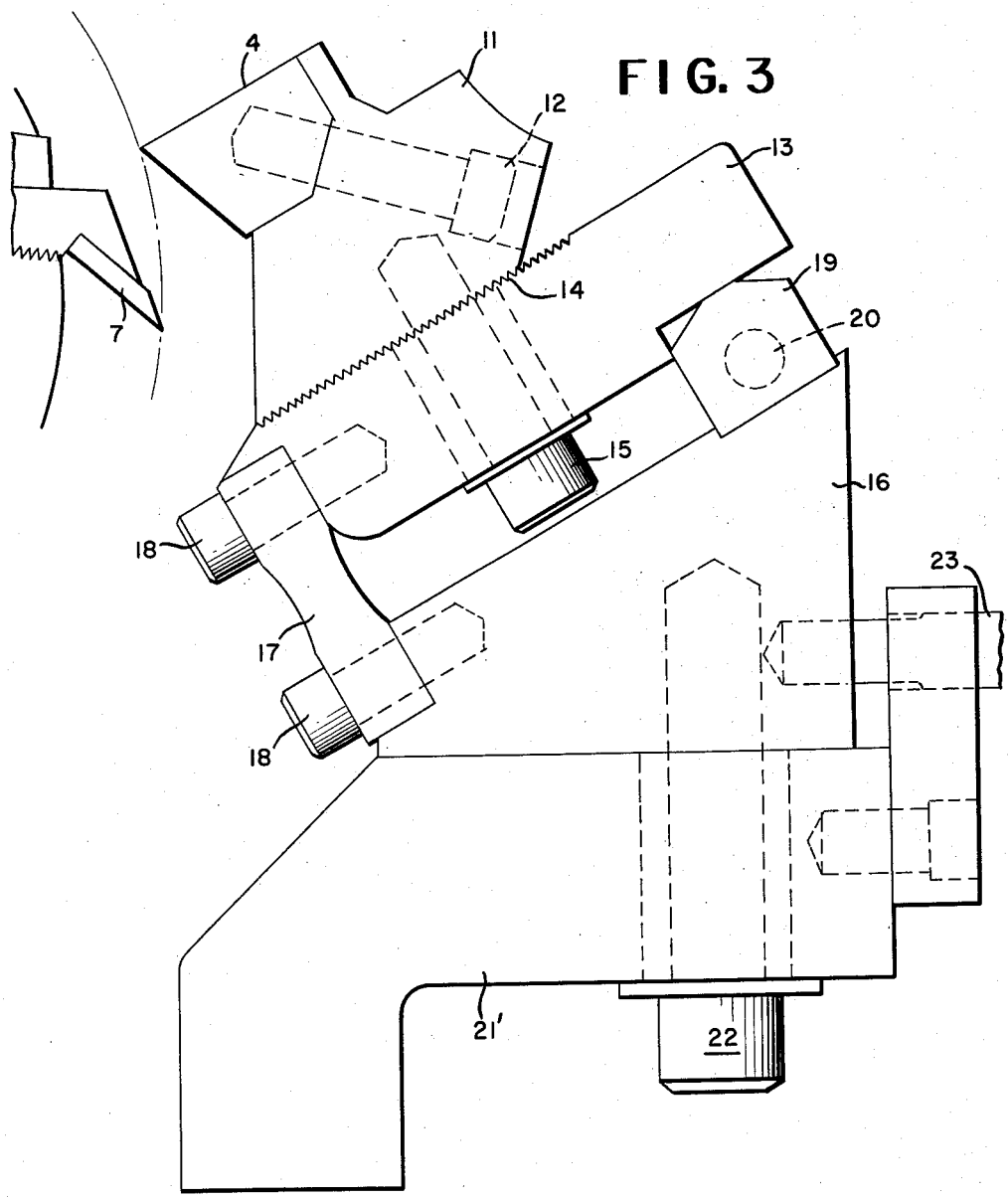

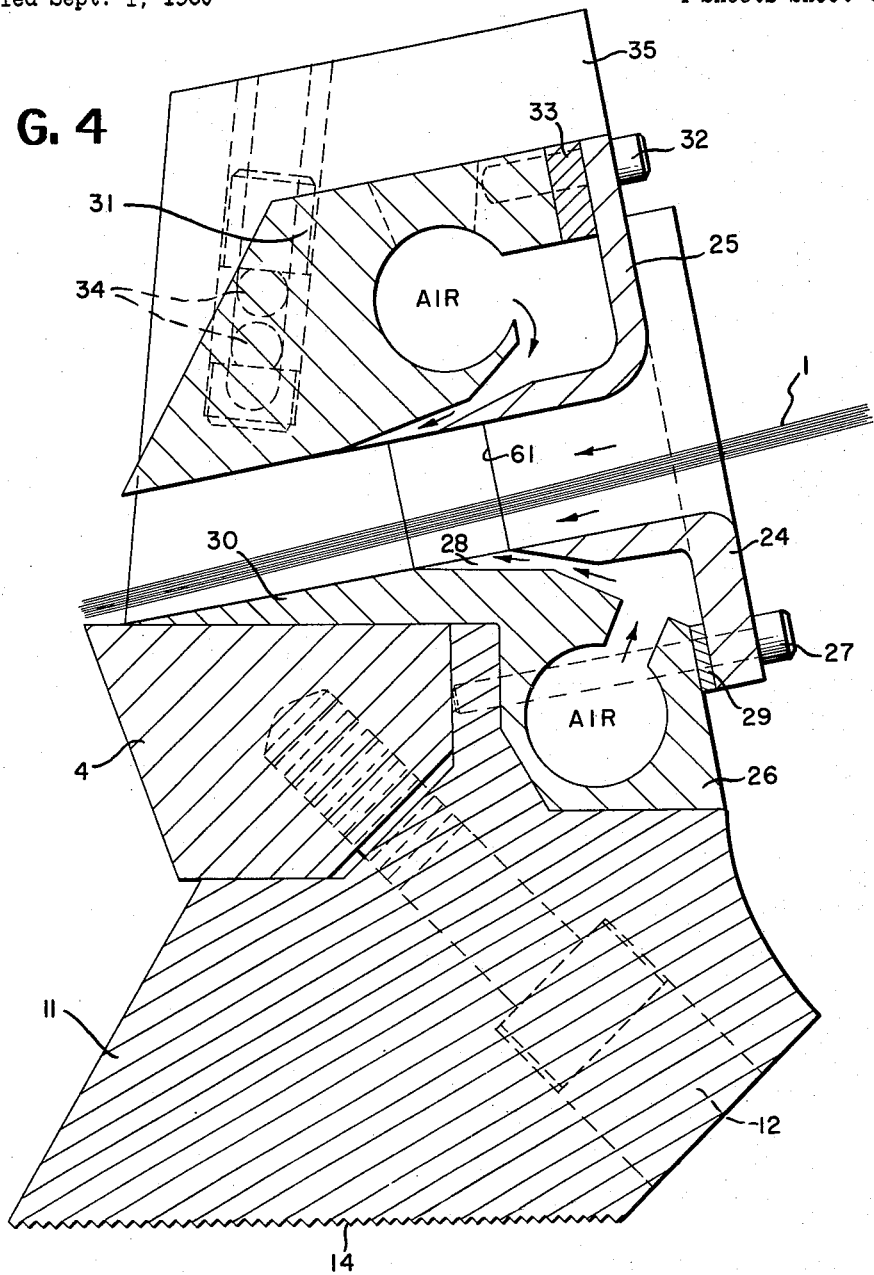

United States Patent Office 3,119,294
Patented Jan. 28, 1964

3,119,294
CUTTING APPARATUS WITH ADJUSTABLE
BLADE MEANS
John George Selby Billingsley, Newark, Del., Lester Rathburn Mummery, Kinston, N.C., and Sherman Arthur Rogers, Landenberg, Pa., assignors to E. I. du Pont de Nemours and Company, Wilmington, Del., a corporation of Delaware
Filed Sept. 1, 1960, Ser. No. 53,542
2 Claims. (Cl. 83—174)

This invention relates to a method of cutting continuous filamentary material into short lengths. It is particularly concerned with a precision cutting apparatus for cutting synthetic fibers into short length staple fibers or flock.

Numerous cutting devices have been previously described for the purpose of cutting continuous filamentary material into short length staple fibers or flock material. However, these devices have been generally unsatisfactory from the standpoint that the cut fibers are not of uniform length. The presence of long or short fibers in flock, for example, results in poor processability of the flock and leads eventually to non-uniform products produced from the flock. Two major factors leading to excessive amounts of long and short fibers in the cut fiber product are the difficulty of precise alignment of the cutting edges, and the difficulty in feeding tow to the cutter in the form of uniformly arranged parallel filaments.

Previously described cutting devices have also been unsatisfactory from the standpoint that they were limited in speed of operation. Devices of higher speed are needed in order to improve productivity.

It is an object of this invention to provide a method of cutting filamentary material into short length fibers or flock wherein the cut fiber exhibits a high degree of uniformity of length.

It is an object of this invention to provide an apparatus capable of cutting filamentary material into uniformly short lengths at higher rates of speed than heretofore attained.

It is a further object of this invention to provide a filament-cutting device capable of precise adjustment of cutting blade position.

A still further object is the provision of a cutting device having an air-jet feed nozzle capable of supplying filamentary material to the cutter in a thin layer of parallel filaments.

Other objects of the invention will become apparent from the following description and the accompanying drawings wherein:

FIGURE 3 is an enlarged side view of the stationary cutting head support arrangement of the apparatus of FIGURE 1 showing the method of precision adjustment.

FIGURE 4 is an enlarged vertical cross-sectional side view of the air-jet nozzle of the FIGURE 1 apparatus which directs the filamentary material to the cutter.

Briefly, the apparatus of this invention includes a rotatable cylindrical cutter head with at least one fiber-cutting blade mounted thereon which cooperates with a stationary fiber-cutting blade to shear or cut off staple fiber or flock-sized fiber from a moving supply bundle of fibers or filaments fed to the stationary blade. A pair of metering feed rolls or equivalent fiber-forwarding means directs the supply yarn or fiber tow into an air-jet nozzle unit which feeds the supply bundle to the cutting area. Around the cutter head is positioned a housing having an opening in the bottom through which the cut fiber is blown into a collecting bin. Alternatively, the opening in the bottom of the housing may be connected by means of a conduit to a suction fan which positively removes the cut fiber from the cutter and deposits it into a receptacle.

The cutting apparatus is particularly characterized by a supporting arrangement for the stationary cutting head which is adaptable to both coarse and fine adjustment of position as described below with reference to the drawings and with particular reference to FIGURES 3 and 5.

The cutting apparatus is also characterized by a novel method for mounting the rotor blades in the rotor as described below.

The cutter is further characterized by an air nozzle feed device having a rectangular mouth which supplies filamentary material to the cutter in the form of a thin layer supported on all sides by a positively directed flow of air moving towards the rotor. This arrangement is more particularly described below with reference to FIGURE 4.

Figure 1:
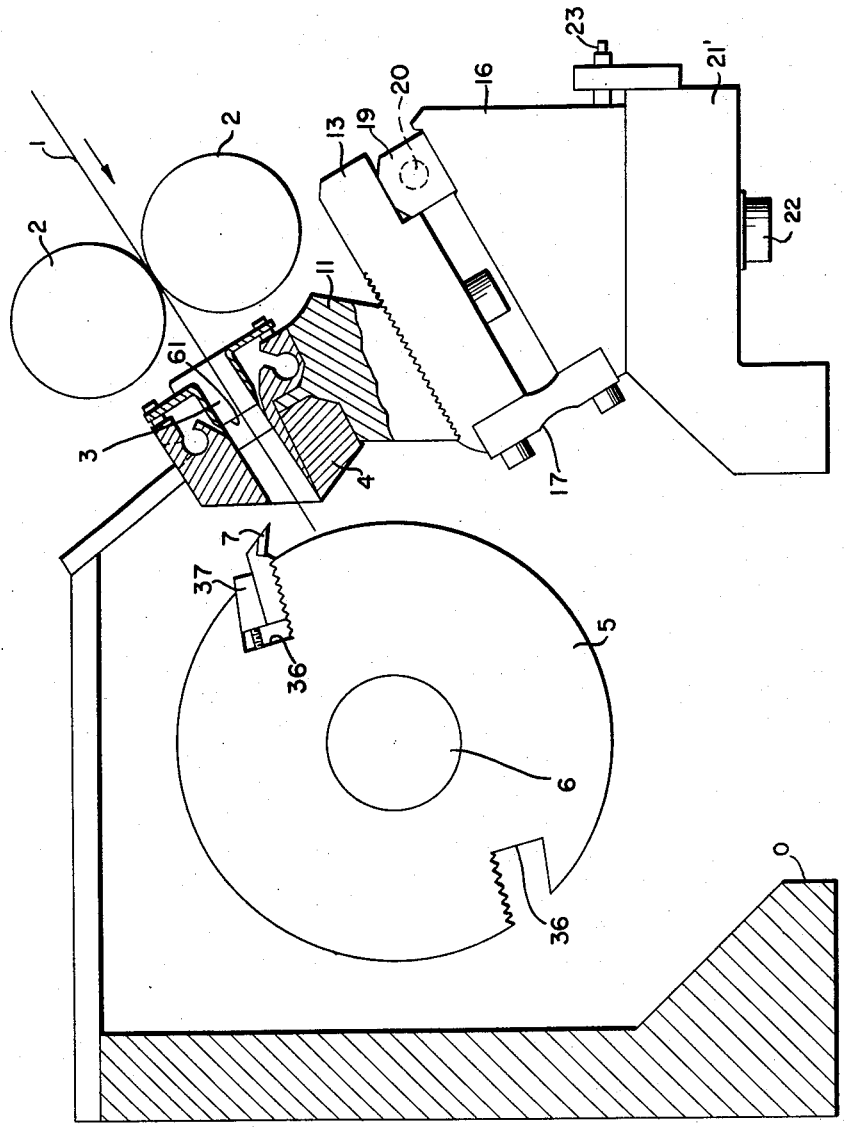
FIGURE 1 is a vertical cross-sectional view of a filament-cutting apparatus embodying features of the present invention.

Referring now to FIGURE 1, which illustrates a preferred embodiment of the fiber cutter, filamentary material 1 is directed by the pair of metering feed rolls 2, 2 into the air nozzle 3 where a blast of air on all sides of the filamentary bundle supports the bundle and directs it to the cutting edge of the stationary cutting blade 4. The rotation of the rotor 5 on shaft 6 brings the rotor blade or blades 7 into contact with the filaments at the cutting edge of said stationary blade 4, shearing the filaments, and subsequently "throwing" them towards the opening O in the bottom of the cutter housing or machine frame 21'.

Figure 2:
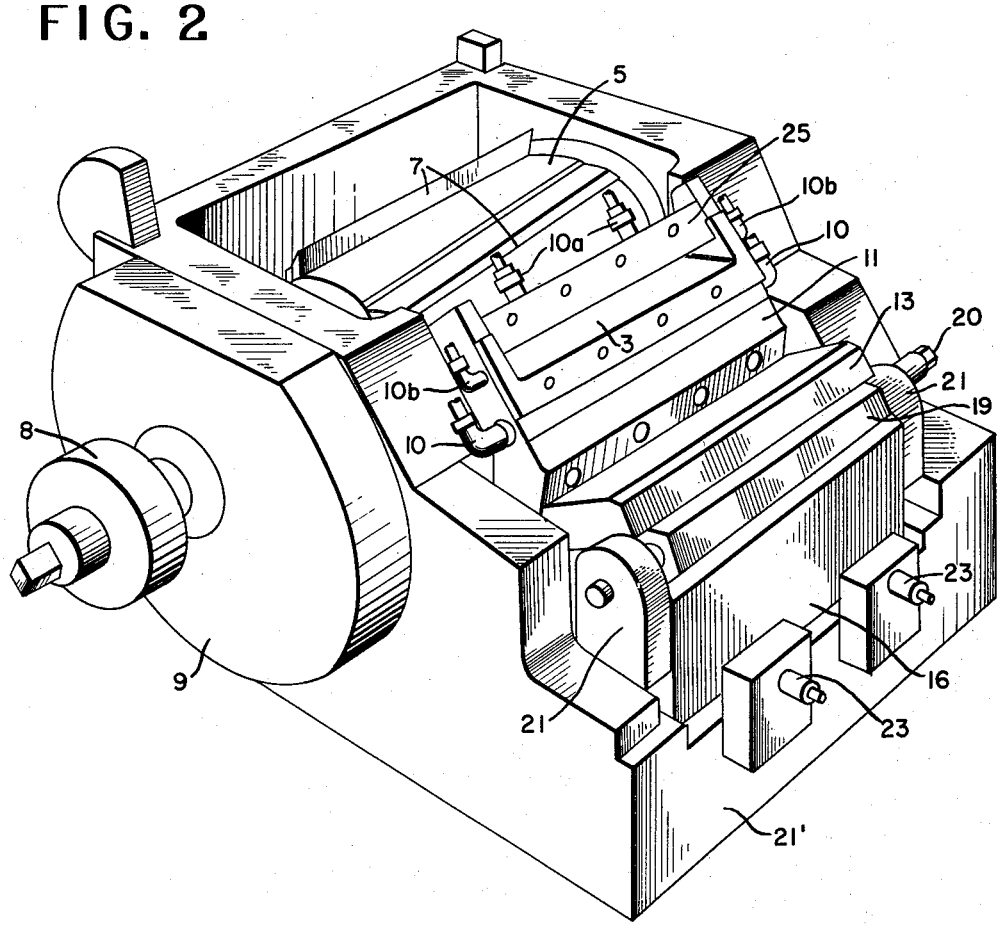
FIGURE 2 is a perspective view of the cutting apparatus of FIGURE 1.

FIGURE 2 is a perspective view of the cutter with the top element removed, particularly showing the location of the pulley 8 which drives the rotor shaft. The housing for the shaft bearings is indicated by number 9. Also indicated in FIGURE 2 are the air supply connnections 10, 10a and 10b for the air nozzle.

FIGURE 3 shows the supporting arrangement for the stationary knife. The bed knife cutting edge insert 4 is attached to the bed knife 11 by means of bolts 12. The bed knife has a serrated lower surface which mates with the serrated upper surface of bed knife support plate 13 at interface 14 and is held in place by means of bolts 15. The length of the cutting edge of the bed knife generally corresponds with the length of the cutting edges of rotor blades 7, as shown in the drawings, and corresponds generally with the major dimensions of support plate 13 as it appears in FIGURE 5. Coarse adjustment of the position of the bed knife with respect to the bed knife support plate is obtained by loosening bolts 15 and moving the bed knife. The serrated surfaces at interface 14 provide positive control of the relative positions of the bed knife and its support plate upon retightening bolts 15.

The bed knife support plate 13 is attached to adjustable base 16 by means of a single stiff steel spring-plate 17 which is bolted to the base and the support plate by means of bolts 18. The heavy steel spring-plate 17, although quite stiff, does allow some relative movement between the base and the support plate depending upon the position of wedge 19. Wedge 19 is moved laterally with respect to the filament path by means of threaded lead screw 20 which meshes with the internal threads of wedge 19 and which is fixed at either end by means of lead screw supports 21 (FIGURES 2 and 5).

Figure 5:
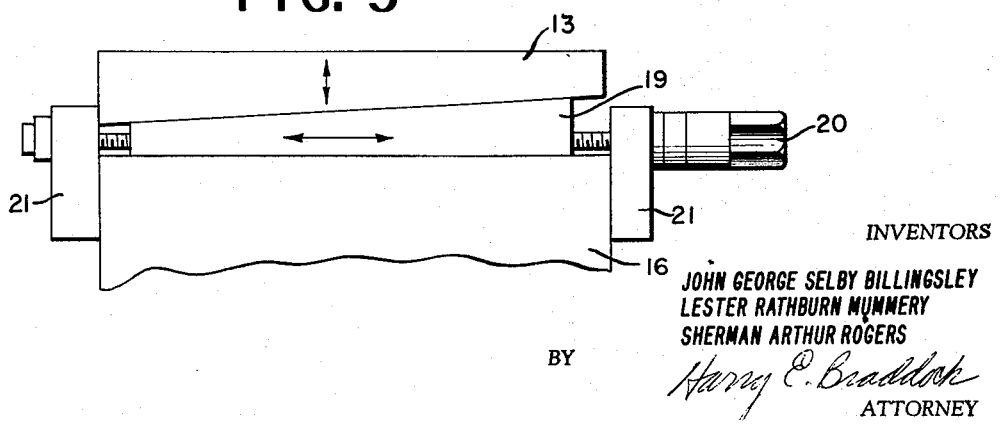
FIGURE 5 is a front view of the cutting head support arrangement of the FIGURE 1 apparatus in which the wedge taper is exaggerated to clearly indicate the wedge action.

As shown in exaggerated form in FIGURE 5, the contiguous surfaces of wedge 19 and bed knife support plate 13 are tapered laterally to the direction of movement of the filamentary material. Thus, a lateral movement of the wedge provides a very fine adjustment of the distance between adjustable base 16 and bed knife support plate 13, at the wedge end, which movement is transmitted through bed knife 11 to the cutting edge of knife insert 4, moving it away from or towards the cylinder of rotation of knife edge 7. A wedge taper of 0.005 inch per linear inch has been found satisfactory for one form of this cutter.

As shown in FIGURE 3, adjustable base 16 is slideably mounted upon machine frame 21', being held in place by locking bolts 22 and differential screws 23. Upon loosening bolts 22 the adjustable base may be moved either towards or away from the rotor by adjusting differential screws 23. In addition to proximity, parallelism of the bed knife with the rotor knife or knives is obtained by differential adjustment of the two adjusting screws 23, 23 (FIGURE 2).

The mounting arrangement for the rotor knife blade or blades is shown in FIGURE 1. The cylindrical rotor body 5 has longitudinal slots 36 in its outer surface which are arranged in a small helical angle. An angle of 5° has been found to be satisfactory. The slots are serrated on one side to match the serrations of knife blade or blades 7 as shown in the figure. The slots are wider at the bottom than at the top to provide for the novel wedge arrangement for holding the knife blade in place. Wedge 37 is inserted in the slot and, after the knife blade is positioned, it is forced away from the bottom of the slot by means of set screws, thereby holding the knife blade tightly in place. The centrifugal force on the wedge element 37 exerted by the rotation of the rotor acts to hold the knife blade or blades even more firmly in place. A tungsten carbide cutting edge has been found to be satisfactory for the rotor blades of this apparatus. For the purpose of illustrating the details of the rotor blade mounting, only one blade 7 is shown mounted on the rotor in FIGURE 1. Obviously, a plurality of rotor blades may be used where desirable as shown in FIGURE 2.

FIGURE 4 shows the essential elements of the air nozzle which directs tow to the cutting edge, and its location on top of the bed knife. The rectangular opening through which the tow enters the nozzle is defined by lower nozzle cover 24 and upper nozzle cover 25. The two ends of the rectangular opening are formed by vertical extensions of lower nozzle cover 24, shown in the drawings. Lower nozzle cover 24 is attached to lower nozzle manifold 26 by means of bolts 27. The air jet opening at 28 is adjustable by proper choice of thickness of shim 29. Air enters the lower nozzle manifold at either end through pipe couplings 10 shown in FIGURE 2. The extended lip 30 of the lower nozzle manifold determines the lower internal contour of the exit end of the nozzle.

Upper nozzle cover 25 is attached to the upper nozzle manifold 31 by means of bolts 32. As with the lower nozzle cover, adjustment of the air jet opening is made by varying the thickness of shim 33. The upper nozzle manifold is supported and positioned by two horizontally extending pins 34 which ride in a vertical slot in sideplate 35 shown by dotted lines only. Portions of the vertical extensions of lower nozzle cover 24 form side air jet openings 61 which are supplied by pipe connections 10b. The vertical position of the upper nozzle manifold is adjustable by means of an adjusting screw riding in the vertical slot which acts against the upper and lower surfaces of the two pins 34. Air enters the upper nozzle manifold through pipe connections 10a on top of the manifold as shown in FIGURE 2. The fluid stream from the jet openings at the top, bottom and sides of the incoming filamentary material serves to align, support, and feed the layer of incoming uncut fibers to the cutting position as well as direct the fibers away from the cutting position after they have been cut.

The arrangement just described for adjusting the vertical position of the upper nozzle manifold and cover assembly is an important aid in adjusting nozzle performance for greatest uniformity of filamentary delivery.

The length of the cut fiber is determined, of course, by the relative speeds of metering feed rolls 2, 2 and rotor 5, and by the number of blades 7 in rotor 5.

The cutter described herein has been found to be satisfactory for synthetic fiber tows having total deniers ranging from 10,000 to 2,000,000 and higher, filament deniers from 0.5 to 15, and with cut lengths ranging from 1/8" to 3/4". Tow has been fed to the cutter at speeds as high as 42 y.p.m. or higher with satisfactory results. The cut fiber has been found to be remarkably free from both short (multiple cut) and long (uncut) fibers. The cut ends of thermoplastic synthetic fibers, when cut by this machine, are found to be free from fusing.

The machine itself, because of the exceedingly fine adjustment of knife blade tolerances, has been found to exhibit surprisingly long knife lives. Furthermore, the arrangement of the cutting elements provides for self-sharpening of the cutting edges.

While a preferred embodiment of this invention has been shown, it is to be understood that changes and variations may be made without departing from the spirit and scope of the invention as defined in the appended claims.

We claim:

1. An improved high speed precision apparatus for cutting a relatively wide, thin layer of moving parallel fibers, comprising a frame structure, an elongated rotor unit rotatably mounted in said frame structure, at least one elongated rotary cutter blade, first means mounting said rotary cutter blade on said rotor unit, a stationary elongated cutter blade, second means mounting said stationary cutter blade in said frame structure in parallel alignment for operative cutting relationship with said rotary cutter blade, third means cooperating with said second means for pneumatically aligning, supporting, and feeding incoming uncut fibers into cutting position with respect to said rotor unit and said stationary cutter blade and also moving cut fibers away from cutting position, said first means comprising a first mechanism for adjusting the radial position of the rotary cutter blade and positively locking the blade in position against radial movement due to centrifugal forces during rotor unit rotation at high speeds, said second means comprising a second mechanism cooperating with said stationary blade, said frame structure and said third means to provide both coarse and fine adjustment of the position of the stationary cutter element and said third means to vary the spacing between said cutter blades, vary the spacing between said third means and said rotor unit, and maintain parallel alignment of said blades during operation of the cutter apparatus, said second mechanism of said second mounting means comprising a first cutter blade mounting element movably secured to said frame structure for angular movement in a given plane to maintain parallel alignment between said blades, a second mounting element spaced from said first element and secured in position to said first element by a resilient leaf spring means connecting said elements and rigidly secured to each of said elements, and a single slidable wedge member positioned between said first and second elements, said leaf spring means comprising a relatively heavy metallic plate element urging said second element toward said wedge member and said first element, actuating means for sliding said wedge member to flex said plate element and cause said second element to vary, in an infinitely variable manner between limits, its spacing from said rotor unit and the rotary cutter blade, a third element rigidly mounted on said second element for limited translational movement with respect thereto to cause said third element to vary in a step by step manner its spacing from said rotor unit and the rotary cutter blade, the stationary cutter blade detachably secured on said third element for spacing and alignment with respect to the rotary cutter blade so that self-sharpening cutting engagement is maintained therewith during operation of the apparatus, said third means comprising two opposed fluid jet units positioned above and below the incoming uncut fibers and arranged to direct converging high velocity fluid streams against top and bottom respectively of an incoming layer of separate uncut fibers to align, support, and feed the fibers into cutting position between the cutter blades, the air stream from said jet units also serving to carry out fibers away from the cutting position, said third means further comprising two additional opposed fluid jet units positioned at each side of the incoming uncut fibers and arranged to direct high velocity fluid streams against the sides of the incoming layer of separate uncut fibers to assist in aligning, supporting, and feeding the fibers into cutting position between the cutter blades and assist in carrying cut fibers away from said cutting position.

2. An improved high speed precision apparatus for cutting a relatively wide, thin layer of moving parallel fibers, comprising a frame structure, an elongated rotor unit rotatably mounted in said frame structure, at least one elongated rotary cutter blade, first means mounting said rotary cutter blade on said rotor unit, a stationary elongated cutter blade, second means mounting said stationary cutter blade in said frame structure in parallel alignment for operative cutting relationship with said rotary cutter blade, third means cooperating with said second means for pneumatically aligning, supporting, and feeding incoming uncut fibers into cutting position with respect to said rotor unit and said stationary cutter blade and also moving cut fibers away from cutting position, said first means comprising a first mechanism for adjusting the radial position of the rotary cutter blade and positively locking the blade in position against radial movement due to centrifugal forces during rotor unit rotation at high speeds, said second means comprising a second mechanism cooperating with said stationary blade, said frame structure and said third means to provide both coarse and fine adjustment of the position of the stationary cutter element and said third means to vary the spacing between said cutter blades, vary the spacing between said third means and said rotor unit, and maintain parallel alignment of said blades during operation of the cutter apparatus, said second means comprising a first cutter blade mounting element movably secured to said frame structure for angular movement in a given plane to maintain parallel alignment between said blades, a second mounting element spaced from said first element and secured in position to said first element by a resilient leaf spring means connecting said elements and rigidly secured to each of said elements, and a single slidable wedge member having a single wedging surface positioned between said first and second elements, said leaf spring means consisting solely of a relatively heavy unitary metallic plate element resiliently urging said second element toward said wedge member and said first element, actuating means for sliding said wedge member to flex said plate element and cause said second element to vary, in an infinitely variable manner between limits, its spacing from said rotor unit and the rotary cutter blade, a third element rigidly mounted on said second element for limited translational movement with respect thereto to cause said third element to vary in a step by step manner its spacing from said rotor unit and the rotary cutter blade, the stationary cutter blade detachably secured on said third element for spacing and alignment with respect to the rotary cutter blade so that self-sharpening cutting engagement is maintained therewith during operation of the apparatus, said third means comprising two opposed fluid jet units positioned above and below the incoming uncut fibers and arranged to direct converging high velocity fluid streams against top and bottom respectively of an incoming layer of separate uncut fibers to align, support, and feed the fibers into cutting position between the cutter blades, the air stream from said jet units also serving to carry cut fibers away from the cutting position, said fluid jet units being detachably mounted on said third element for simultaneous positioning and aligning movement with the stationary cutter blade upon actuation of said wedge member of said second mechanism of the second mounting means.

References Cited in the file of this patent

UNITED STATES PATENTS

| | | |
|---|---|---|
| 1,730,449 | Campbell | Oct. 8, 1929 |
| 1,978,826 | Walton et al. | Oct. 30, 1934 |
| 2,100,930 | Aiken | Nov. 30, 1937 |
| 2,217,766 | Neff | Oct. 15, 1940 |
| 2,660,242 | Lane | Nov. 24, 1953 |
| 2,751,006 | Lane | June 19, 1956 |
| 2,782,853 | Heffelfinger | Feb. 26, 1957 |
| 2,832,411 | Richards et al. | Apr. 29, 1958 |
| 2,846,004 | Fotland | Aug. 5, 1958 |
| 2,885,257 | Courtney | May 5, 1959 |
| 2,961,909 | Hemker et al. | Nov. 29, 1960 |

FOREIGN PATENTS

| | | |
|---|---|---|
| 72,362 | Sweden | May 13, 1929 |
| 544,605 | Germany | Feb. 19, 1932 |
| 726,246 | Great Britain | Mar. 16, 1955 |
| 1,087,957 | Germany | Aug. 25, 1960 |